ary 14, 1964

3,117,942
LATEX WEBBING FINISH COMPOSITION CONTAINING WATER SOLUBLE POLYETHYLENE OXIDE AND METHOD OF APPLYING
Joseph G. Kingston and George E. Vale, Jr., Cleveland, Ohio, assignors to The Glidden Company, Cleveland, Ohio, a corporation of Ohio
Filed June 1, 1960, Ser. No. 33,195
2 Claims. (Cl. 260—23.7)

This invention relates to a webbing composition adapted for spray application, process for forming a webbed coating with same, and resulting web-coated article.

Heretofore webbed coatings and finishes (such finishes also being known as veiling finishes) have been made from lacquer or enamel compositions using a judicious proportioning of volatile organic solvents. The formulating is extremely delicate, and the range of finish types extremely limited. Such webbing systems depend upon obtaining substantial drying of the sprayed material before it hits the surface to which it is to be applied in order to prevent normal coalescence, whereas our webbing compositions do not tend to coalesce very much even when, in a substantially wet condition, they strike a surface. Accordingly our compositions are much less sensitive with regard to application technique or particular solvent balance for obtaining a desired webbing effect.

The present invention has the advantage over such prior art technique of being extremely versatile, that is, applicable to a wide variety of organic film-forming material and including especially webbing compositions using normally film-forming water emulsions of latex-based compositions. Accordingly, a wider range of webbing types are made available in this field by virtue of the instant invention. Also, the invention enables the user to obtain specific advantages of special film-forming types not heretofore suitable for webbing; such advantages include increased durability, less embrittlement, rapid freedom from tackiness, high solids content per unit volume of composition, and the elimination of or substantial reduction of hazard from evaporating flammable light solvent.

Our webbing composition consists essentially of an organic film-forming material capable normally of forming a continuous film by air drying, e.g., a conventional emulsion-style protective coating or organic solvent solution protective coating, and about 1.0–6%, based on the weight of vehicle solids in said film-forming material, of a high molecular weight, water soluble polymerized ethylene oxide, suitably in aqueous dispersion. Viscosity (No. 4 Ford cup at 77° F.) of the composition is adjusted to 20–60 seconds for spraying.

Preferably, for efficiency and economy in the practice of our invention, viscosity adjustment of the webbing composition can be done by adding a thinner compatible with liquid phase of the composition, e.g., water to an emulsion paint. Such thinner can be added with the water soluble polymer or separately therefrom. Such viscosity is also adjustable by varying the water soluble polymer proportion within the stated range on the one hand, and by selection of a particular water soluble polymer of the type described having average molecular weight between about 100,000 and about 5,000,000 (Staudinger). In general the higher molecular weight polymers impart a greater viscosity at a given dosage than do the lower molecular weight ones.

Our process comprises blending together said organic film-forming material and the high molecular weight water soluble polymer of the type described in the proportions stated and adjusting said viscosity to a value between 20 and 60 seconds, and spraying the resulting blend onto a support which can be, for example, a previously painted or unpainted panel, an architectural or a structural surface, a paper or cloth or metal or other sheetlike material, or even a discontinuous supporting structure such as a matrix of netting, a plurality of flexible tapes, cords, or the like.

A further aspect of our invention is the article of manufacture resulting from our process, in which the webbed residue of the sprayed composition described at least partially covers a supporting structure for decorative or protective purposes.

The drawing is a full-scale photograph of our veiling finish applied to brown paper, the webbing composition used being a conventional off-white latex emulsion paint applied as a web according to the precepts of our invention. It is random in pattern and useful for novelty decorative finishing in an economical fashion.

The high molecular weight water soluble polymers for blending into the continuous film-forming organic material can have an average molecular weight (Staudinger) of between about 100,000 and about 5,000,000. If the average molecular weight is substantially below about 100,000 the proportion thereof necessary to effect our desired webbing action is impractically greater, and some of the desired characteristics of the resulting webbing can be deleteriously affected, e.g., the finish obtained has a high water sensitivity, the finish and its color effect is diluted too much, and the cost is quite high. If the polymer has a molecular weight substantially above about 5,000,000, the upper desirable viscosity ranges of the resulting webbing composition become difficult to control and the polymer is difficult to incorporate into the organic film-forming material.

The useful high molecular weight polymer additives here are water soluble, and we have found it necessary to incorporate them as aqueous dispersions into the otherwise normally continuous film-forming base material for effectiveness of blending and good webbing effect. Preferably, for efficiency and economy in the practice of our invention, said polymer additives are added as, for example, 1–10% solutions in plain water with simple paddle stirring, but the useful aqueous dispersions can have in them other cosolvents, or solvent mixtures if desired, e.g., lower alkanols such as methanol or isopropanol, acetone, acetonitrile, trichlorethylene, etc. Advantageously molecular weight of the soluble polymer used is between 200,000 and 2,000,000 and preferably between about 300,000 and 1,000,000 for the most effective and efficient practice of our invention.

The critical proportion of water soluble polymer in the practice of our invention is based on the weight percentage of dry water soluble polymer relative to the vehicle solids of the film-forming material (which itself is exclusive of pigment, filler, volatile solvent, or water). If substantially less than about 1.0% of the water soluble polymer called for is used, webbing does not occur in any satisfactory fashion and the effect is preponderantly one of spattering. If more than about 6% of the water soluble polymer is used, the webbing composition becomes too viscous to spray in conventional apparatus. For decorative application using conventional pigmented paints of the latex emulsion or solvent-base types, the critical proportion of water soluble polymer then works out usually to between about ¼% and ¾% based on the total paint solids. Prolonged high shear mixing of the water soluble polymer into aqueous dispersion or solution is to be avoided because of the risk of reducing the tendency of the resulting blend made therewith to web effectively. Satisfactory dispersion of the polymer into aqueous dispersion, then, can be done with paddles, propellers, turbines and other conventional apparatus at moderate to low speed. Blending of the resulting dispersion into the film-former can be done by simple mixing also to obtain apparent homogeneity.

The blending of the webbing composition can be done immediately prior to its spraying or literally months in advance for packaging and storing in conventional manner. A special feature of our compositions is their long storage stability, e.g., six months and even more, in conventional packaging. Additionally, because of the wide range of normally continuous film-forming organic protective coatings which can be used in compounding our webbing or veiling finish, a wide variety of specialty packings can be used for specific normally film-forming bases.

The suitable ethylene oxide polymers for use in the practice of our invention can be made in conventional manner and are widely commercially available, e.g., those made in accordance with the teachings of U.S. Patents 2,866,761 (Example 2); 2,914,491; and 2,917,470. The suitable ethylene oxide polymers for our use can be described broadly as protective colloids and are eucolloidal in nature.

The organic materials capable normally of forming a continuous film by air drying, and these are the basis for the resulting web, can be conventional latex emulsion paints.

Alternatively, the film-former can be unpigmented, or lightly pigmented, or tinted. Thus, for example, it can be a pigmented, inert-filled or an unpigmented emulsion such as a polyvinyl acetate emulsion, or a copolymer of vinyl acetate with vinyl chloride, vinylidene chloride, acrylonitrile, or the like, particularly where a high solids content is especially desirable for applying the webbing to a support for a protective purpose such as a cocoon (around equipment in storage and where decorativeness is not a special object).

Among the most suitable organic film-formers for decorative webbing finishes are latex emulsion paints such as the sort shown in U.S. Patent 2,709,689 (a styrene-butadiene latex type) or one in which the latex is all or partly the copolymer of heat-bodied glyceride oil and a vinylic monomer (such as styrene) as shown in U.S. Patent 2,926,151.

The spraying is done from a conventional paint spray gun, and preferably, for efficiency and economy, we use air as the propellant. For forming the decorative webbing finishes as illustrated in the photographs the gun is generally maintained about 6–8 inches from the surface to which the webbing is being applied, and the spray tip on the gun can be, for example, from about 0.04 inch to 0.15 inch in diameter or even larger. The air pressure ordinarily preferred is between about 30 and about 40 p.s.i.g.

The following examples show ways in which our invention has been practiced, but should not be construed as limiting the invention. In this specification all percentages are weight percentages, all parts are parts by weight, and all temperatures in degrees Fahrenheit unless otherwise expressly stated.

In the following tabulated examples paint "A" was a latex paint made essentially as shown in Example 1 of U.S. Patent 2,709,689. Paint "B" was a flatter latex emulsion paint of similar type. The fundamental difference between latex paint "B" formulation and that shown in Example 1 of U.S. Patent 2,709,689 was that equal parts of a styrene-butadiene latex and the heat-bodied linseed oil-styrene latex of Example 1 of U.S. Patent 2,926,151 were used instead of a latex consisting entirely of a butadiene-styrene copolymer. A further difference between both latex paints "A" and "B" and that of Example 1 of 2,709,689 was that the styrene-butadiene latex used in "A" and "B" was a 60% styrene-40% butadiene copolymer instead of a 75% butadiene-25% styrene copolymer, and it had 48% non-volatile matter instead of 40%. Paint "B" had 49–50% total non-volatile matter and roughly 11.5% vehicle solids. Paint "A" had 52½% total non-volatile matter and about 18.6% vehicle solids.

In one group of tabulated tests the water soluble polymer was polyacrylamide having an average molecular weight of about 1,000,000 and was used in a proportion of ½% based on the weight of total paint. This polymer had bulk density of 30 lbs. per cubic foot, volatile matter 5%, Browning Range 261–265° C. (1 minute in a Parr Bomb), ash of 0.5% when ignited at 850° C., monomer content of 0.05%, and could be made in a manner similar to that of Example 3b of U.S. Patent 2,917,477.

In the group of tabulated tests the water soluble polymer used was an ethylene oxide polymer having average molecular weight of about 500,000, and it was used in the proportion of ½% based on the total paint weight. This polymer had viscosity of 1500–2500 centipoises in 25% aqueous solution at 25° C., a melt viscosity of 23000–26000 poises at 150° C., and could be made in a manner similar to that of Example 2 of U.S. Patent 2,866,761.

The webbing compositions were made by adding a 5% aqueous solution of the water soluble polymer to the particular paint to be webbed, and the blend was formed by stirring the mixture lightly for a few minutes. The gun used was a conventional paint spray gun with a 0.07 inch diameter fluid tip and using air pressure between 30 and 40 p.s.i.g. The gun was held about 6–8 inches from the panel surface to be decorated.

| Paint Composition | Water Soluble Polymer Added | Result |
|---|---|---|
| A | Ethylene Oxide Polymer | Decorative web. |
| B | do | Do. |

We claim:
1. A process for forming a webbed coating which comprises blending together an aqueous dispersion of latex capable normally of forming a continuous film upon air drying when deposited from said aqueous dispersion, and about 1.0–6%, based on the latex solids of said aqueous dispersion, of water soluble polymerized ethylene oxide having average molecular weight between about 100,000 and about 5,000,000, adjusting the viscosity of the resulting blend to a No. 4 Ford cup value at 77° F. between about 20 and about 60 seconds, and spraying the resulting blend onto a supporting structure.

2. A webbing composition adapted for spray application and comprising an aqueous dispersion of latex, said latex being capable normally of forming a continuous film upon air drying when deposited from said aqueous dispersion, and from about 1.0 to about 6% based on the latex solids of said aqueous dispersion, of water soluble polymerized ethylene oxide having average molecular weight between about 100,000 and about 5,000,000.

References Cited in the file of this patent

UNITED STATES PATENTS

| 1,919,798 | MacLaurin | July 25, 1933 |
| 2,133,257 | Strain | Oct. 11, 1938 |
| 2,914,498 | Quarles et al. | Nov. 24, 1959 |

OTHER REFERENCES

Schildknecht: "Vinyl and Related Polymers," John Wiley and Sons, New York, 1952, pages 314–317.

Wagner et al.: "Lackkunsharze," Carl Hanser Verlog, Munch, 1959, page 205.

UNITED STATES PATENT OFFICE
CERTIFICATE OF CORRECTION

Patent No. 3,117,942 January 14, 1964

Joseph G. Kingston et al.

It is hereby certified that error appears in the above numbered patent requiring correction and that the said Letters Patent should read as corrected below.

Column 2, line 46, before "soluble" insert -- water --.

Signed and sealed this 16th day of June 1964.

(SEAL)
Attest:

ERNEST W. SWIDER
Attesting Officer

EDWARD J. BRENNER
Commissioner of Patents